United States Patent
Rochford et al.

(10) Patent No.: US 7,562,312 B2
(45) Date of Patent: Jul. 14, 2009

(54) 3-DIMENSIONAL GRAPHICAL USER INTERFACE

(75) Inventors: Ciaran Thomas Rochford, Sunnyvale, CA (US); Bing Xia, Fremont, CA (US); Ruifeng Xu, Mountain View, CA (US); Aga Orlova, Livermore, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 11/552,799

(22) Filed: Oct. 25, 2006

(65) Prior Publication Data

US 2007/0164989 A1 Jul. 19, 2007

Related U.S. Application Data

(60) Provisional application No. 60/759,347, filed on Jan. 17, 2006.

(51) Int. Cl.
*G06F 15/00* (2006.01)
*G06F 13/00* (2006.01)

(52) U.S. Cl. ..................................... 715/848; 715/850
(58) Field of Classification Search ......... 715/853–854, 715/863, 848, 771, 763, 744, 850, 852
See application file for complete search history.

(56) References Cited

U.S. PATENT DOCUMENTS

| 2001/0028369 | A1* | 10/2001 | Gallo et al. ................. 345/848 |
| 2004/0100479 | A1* | 5/2004 | Nakano et al. ............. 345/700 |
| 2006/0020904 | A1* | 1/2006 | Aaltonen et al. ........... 715/850 |
| 2006/0107229 | A1* | 5/2006 | Matthews et al. .......... 715/782 |

* cited by examiner

*Primary Examiner*—Cao (Kevin) Nguyen

(57) ABSTRACT

A system comprising a display, a processor, and a storage device is provided. The storage device is operable to store instructions that, when executed by the processor, display on the display a graphical user interface that includes a plurality of objects. The plurality of objects each have a substantially similar shape. Each object includes a plurality of menu items visible on the object and one or more of the menu items are associated with applications.

18 Claims, 13 Drawing Sheets

3-DIMENSIONAL GRAPHICAL USER INTERFACE

CROSS-REFERENCE TO RELATED APPLICATIONS

This application claims priority to the provisional application, U.S. Pat. App. No. 60/759,347, entitled "Handset User Interface Application", filed on Jan. 17, 2006, by Ciaran Thomas Rochford. The above-referenced provisional application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Desktop and laptop computers typically have a menu system that allows users to launch applications, adjust settings, access data, and perform other functions. The menu system typically has a hierarchical structure in which a top-level menu contains a relatively small number of menu items. Each top-level menu item might expand into several sub-menus, each sub-menu might expand into several sub-sub-menus, and so on. A user might perform a function by selecting an appropriate top-level menu item, navigating through one or more sub-menus until a menu item corresponding to the desired function appears, and then selecting the menu item. Navigation through a menu system might be carried out by pointing and clicking a mouse, pressing navigation keys on a keyboard, or manipulating other input devices typically associated with a computer system.

SUMMARY

In one embodiment, a system comprising a display, a processor, and a storage device is provided. The storage device is operable to store instructions that, when executed by the processor, display on the display a graphical user interface that includes a plurality of objects. The plurality of objects each have a substantially similar shape. Each object includes a plurality of menu items visible on the object and one or more of the menu items are associated with applications.

In another embodiment, a mobile handset comprising a processor, a storage device, a plurality of applications, a display, and a program is provided. The program, when executed by the processor, displays on the display a graphical user interface that includes a plurality of three-dimensional objects. The plurality of objects each has a substantially similar shape. Each object includes a plurality of menu items visible on the object and one or more of the menu items are associated with applications. At least some of the applications are stored on the storage device.

In another embodiment, a computer readable medium is provided. The computer readable medium includes instructions that, when processed by a processor, promote displaying a graphical user interface to a display. The graphical user interface comprises a three-dimensional environment. A plurality of substantially similar three-dimensional objects are provided in the environment and a plurality of menu items are disposed adjacent the objects. At least some of the menu items are related to applications.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
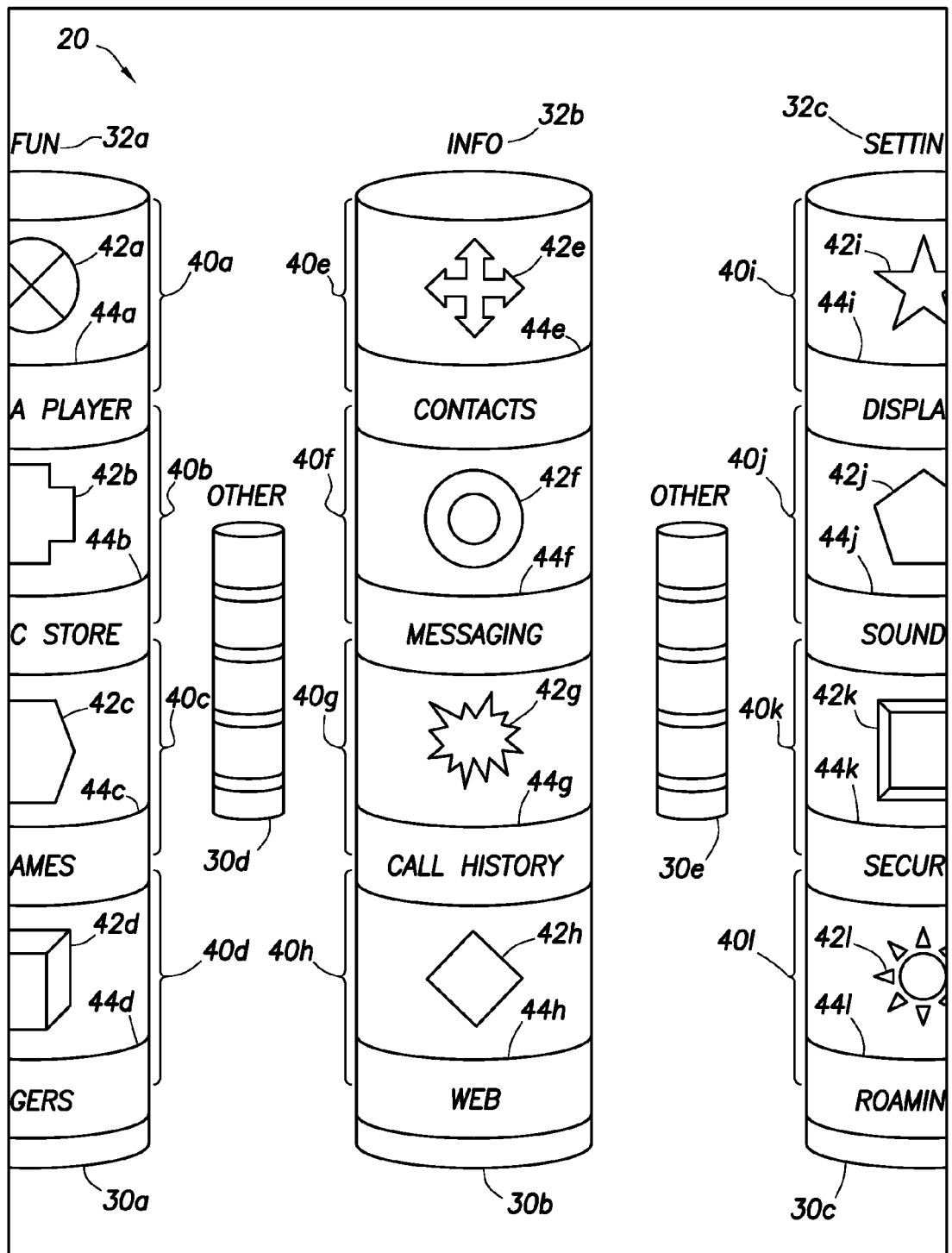
FIG. 1 illustrates a portion of a menu system according to an embodiment of the disclosure.

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Handheld electronic devices such as mobile telephones, personal digital assistants, handheld computers, and similar devices will be referred to herein as handsets. Handsets typically have small display screens compared to the display screens typically used with desktop and laptop computer systems. A large menu system that might easily fit on a computer screen might not fit on a handset screen at a resolution that can easily be read. Also, navigation through a menu system on a handset screen might be more difficult than navigation through a menu system on a computer screen since handsets are typically not equipped with easy-to-use navigation mechanisms, such as mice or large-sized, dedicated navigation keys, that are typically available on desktop and laptop computers.

Embodiments of the present disclosure provide a menu system that allows a plurality of groups of menu items to be displayed on the screen of a handset. A 'virtual world' is created in which a plurality of objects containing the groups of menu items is present. Only a portion of the virtual world and only a portion of the objects may be visible on the handset screen at any time. A handset user can use the navigation keys or other input mechanisms on the handset to pan through the screen and bring other portions of the virtual world into view.

The objects containing the menu items can take on various shapes and sizes and can appear in various locations on the screen. In an embodiment, the shape and/or size of a menu object is related to the dimensions of the handset screen on which the menu system appears. For example, on a screen with a 'portrait' layout, that is, a screen with a greater vertical dimension than horizontal dimension, a menu object might have a greater size in the vertical dimension than in the horizontal dimension. On a screen with a 'landscape' layout, that is, a screen with a greater horizontal dimension than vertical dimension, a menu object might have a greater size in the horizontal dimension than in the vertical dimension.

The objects containing the menu items might be provided with scaling, shadowing, and other well-known effects that can give a three-dimensional appearance to the objects and to the virtual world in which the objects appear. That is, each object can be made to appear to have depth rather than being two-dimensional and some objects might appear to be closer to the user than other objects. Navigation keys or other input mechanisms on the handset might be used to create an appearance of moving into and out of the screen so that objects at different apparent depths can be selected.

FIG. 1 illustrates an embodiment of a menu system for a handset. On a display screen 10 of a handset, a portion 20 of a 'virtual world' is depicted. The virtual world contains a plurality of objects 30, each of which contains a group of menu items 40. The objects 30 remain at fixed locations within the virtual world. A user can navigate through the virtual world and cause different portions of the virtual world and different objects 30 to be displayed on the screen 10. For example, while only five objects 30 are currently visible on the screen 10 in FIG. 1, the user might pan left, right, up, or down through the screen 10 to reveal other objects 30 that are present in the virtual world but cannot currently be seen.

In this embodiment, the objects 30 have a cylindrical shape with the long dimension of the cylinder disposed in the same direction as the long dimension of the screen 10 and the short dimension of the cylinder disposed in the same direction as the short dimension of the screen 10. In other embodiments, the objects 30 could have other shapes but optimum use will be made of the space in the screen 10 when the dimensions of the shape match, or are at least related to or consider, the dimensions of the screen 10 in this manner.

In the embodiment of FIG. 1, object 30a, object 30b, and object 30c appear to be in the foreground of the screen 10 and object 30d and object 30e appear to be in the background. Having only three objects 30 in the foreground can facilitate navigation through the foreground objects 30. When the user is aware that only three objects 30 are present in the foreground and the user sees object 30a on the left of the screen 10, object 30b in the center of the screen 10, and object 30c on the right of the screen 10, the user can easily determine that panning to the left or right will bring object 30a or object 30c to the center of the screen 10.

If the user were to see no object on the left of the screen 10, object 30a in the center of the screen 10, and object 30b on the right of the screen 10, the user could easily determine that navigation to the left would not be possible and that object 30c was present in the virtual world but invisible to the right of object 30b. Similarly, if the user were to see no object on the right of the screen 10, object 30c in the center of the screen 10, and object 30b on the left of the screen 10, the user could easily determine that navigation to the right would not be possible and that object 30a was present in the virtual world but invisible to the left of object 30b.

If more objects 30 were present in the foreground of the virtual world than could be seen on the screen 10 at one time, the user could not easily make such determinations. For example, if four objects 30 were present in the foreground of the virtual world and only three appeared at a time on the screen 10, the user would not necessarily know whether the center object 30 of the three objects 30 on display was the left-center object 30 of the four objects in the virtual world or the right-center object 30 of the four objects in the virtual world. In such a situation, the user might be uncertain about which direction to pan in order to view a desired object 30 that is currently out of the view of the screen 10.

If more than three objects 30 were displayed in the foreground of the screen 10, the small size of the screen 10 might require that the objects 30 be displayed with such a small size that the user might not easily see the menu items 40 in the objects 30. Therefore, the number of objects 30 that are displayed in the foreground of the screen 10 might depend on the size of the objects 30 and the size of the screen 10. It might be preferable that the number of objects 30 that appear in the foreground of the screen 10 be no greater than the maximum number that allows the menu items 40 in the objects 30 to be readily visible. For ease of navigation through the virtual world, it might be preferable that the number of objects 30 that are placed in the foreground of the virtual world be no greater than the number of objects 30 that appear in the foreground of the screen 10 at any one time.

If it is desired to have more objects 30 in the virtual world than the number of objects 30 that can suitably appear in the foreground of the screen 10, the additional objects 30 might be placed in the background of the virtual world. This is illustrated in FIG. 1, where object 30a, object 30b, and object 30c are scaled to appear to be in the foreground and object 30d and object 30e are scaled to appear to be in the background. If the user wished to select a menu item in background object 30d or background object 30e, the user might use the navigation keys or another input mechanism on the handset to navigate into the background of the virtual world. The user might then cause the desired background object 30d or 30e to move to the foreground and then select a menu item within that object 30. Alternatively, the user might select a menu item within one of the background objects 30 while the object 30 is still in the background.

Each object 30 contains a plurality of menu items 40 that are grouped together in that object 30 based on one or more shared characteristics. Each object 30 might have a label 32 that identifies the object 30 and suggests the common attributes of the items 40 in the object 30. For example, an 'info' label 32b is placed near object 30b to indicate that the 'contacts' item 40e, the 'messaging' item 40f, the 'call history' item 40g, and the 'web' item 40h in object 30b all deal with information-related services on the handset. While each object 30 is shown containing four items 40, in other embodiments other numbers of items 40 could be present in each object 30.

Each item 40 might include an icon 42, a text label 44, or both. The icons 42 might symbolically represent the functions that are associated with the items 40 on which the icons 42 appear and the text labels 44 might describe the functions that are associated with the items 40 on which the text labels 44 appear. The icons 42 and text labels 44 shown in FIG. 1 should be understood to be examples only. In other embodiments, other icons and other text labels could be used. Also, in other embodiments, other types of representations could be used to indicate the functions associated with the items 40.

One of the items 40 might be selected by using navigation keys or similar input mechanisms on a handset to select an icon 42 or a text label 44. Selecting one of the items 40 might launch an application, allow adjustments to be made to settings, provide access to data, or perform other functions that are typically performed when traditional menu items are selected. Alternatively, selecting one of the items 40 might cause a plurality of sub-items to appear.

Figure 2:
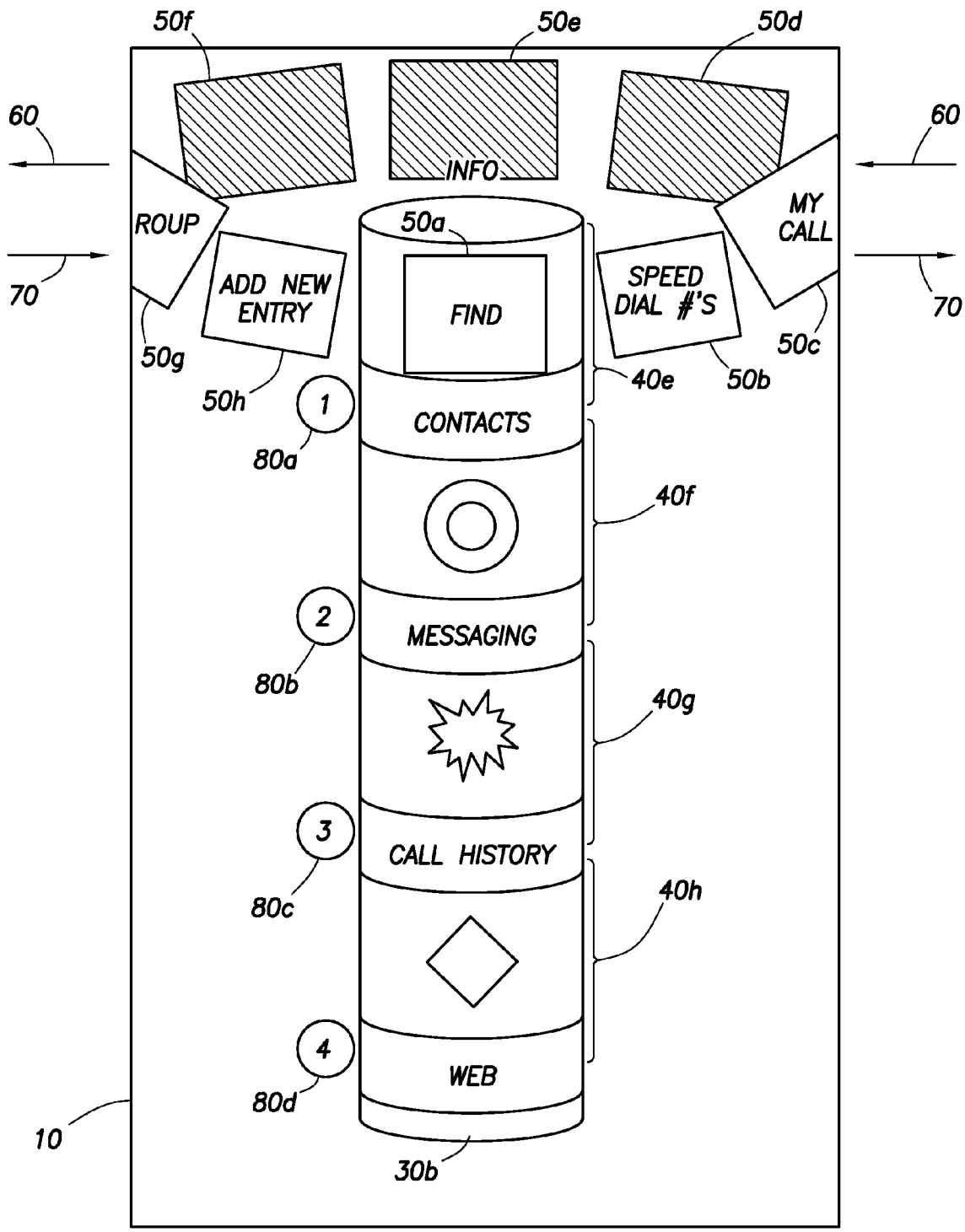
FIG. 2 illustrates another portion of the menu system according to an embodiment of the disclosure.

FIG. 2 illustrates a set of sub-items 50 that might appear when one of the items 40 is selected. In this example, item 40e, which is associated with a 'contacts' function, has been selected and a group of sub-items 50 related to the 'contacts' function is displayed. Each sub-item 50 might include an icon, a text label, or some other indicator of the function that will be performed if the sub-item 50 is selected. In an embodiment, the sub-items 50 are arranged near the item 40 to which they are related in a pattern that corresponds to the shape of the object 30 in which the item 40 appears. The arrangement of the sub-items 50 might have a three-dimensional appearance.

For example, since object 30b has a cylindrical shape, the set of sub-items 50 associated with one of the items 40 within object 30b might be arranged in a three-dimensional, circular pattern. This is illustrated in FIG. 2, where the sub-items 50 are arrayed in a circle around item 40e and sub-items 50a, 50b, 50c, 50g, and 50h appear to be in front of object 30b and sub-items 50d, 50e, and 50f appear to be behind object 30b. While sub-items 50d, 50e, and 50f are depicted with their back portions turned toward the user and with the text or other information on their front portions not visible, in other embodiments the text or other information on the front portion of one or more of the sub-items 50 might be visible while the sub-items 50 appear to be behind one of the objects 30. If a different one of the items 40 in object 30e had been selected, a set of sub-items associated with that item 40 might appear in a three-dimensional, circular pattern around that item 40.

The handset user can use navigation keys or similar input mechanisms on the handset to bring a desired sub-item 50 into view. For example, a 'left' key might be used to rotate the ring of sub-items 50 in a left 60 or clockwise direction and a 'right' key might be used to rotate the ring of sub-items 50 in a right 70 or counterclockwise direction or vice versa. In an embodiment, the user might select one of the sub-items 50 by pressing an appropriate handset key when the desired sub-item 50 is aligned with the object 30b, as sub-item 50a is aligned in FIG. 2. Alternatively, direct selection of any of the sub-items 50 might be allowed regardless of the position of the sub-item 50.

The use of a circular pattern for the sub-items 50 can reduce the number of keystrokes needed to select one of the sub-items 50, compared to the selection of a menu item in a traditional, linear menu. For example, if a traditional, linear menu contained eight items, seven keystrokes would be needed to navigate from the top item to the bottom item. With the circular arrangement of sub-items 50 allowing navigation in either a clockwise or a counterclockwise direction, no more than four keystrokes would be needed to move from one sub-item 50 to any other sub-item 50 in the eight-sub-item menu. This can be particularly helpful on handsets, where the navigation keys tend to be smaller and more difficult to manipulate than the navigation mechanisms on a desktop or laptop computer.

In an embodiment, the handset navigation keys might be used to move from one item 40 to another within an object 30. For example, if the 'contacts' item 40e has been selected and the user wishes to move to the 'web' item 40h, the user might press a 'down' key three times or might press an 'up' key once. Alternatively, a shortcut indicator 80 might be associated with each item 40 to allow easier selection of the items 40. This is illustrated in FIG. 2, where a '1' shortcut indicator 80a is associated with the 'contacts' item 40e, a '2' shortcut indicator 80b is associated with the 'messaging' item 40f, a '3' shortcut indicator 80c is associated with the 'call history' item 40g, and a '4' shortcut indicator 80d is associated with the 'web' item 40h. When the user wishes to select a particular one of the items 40, the user might simply press the key on the handset keypad that corresponds to the shortcut indicator 80 for the desired item 40. For example, pressing the '4' key might cause a ring of sub-items associated with the 'web' item 40h to appear around the 'web' item 40h.

In an embodiment, the shortcut indicators 80 might appear on the screen 10 only after one of the items 40 has been selected, as shown in FIG. 2. Before one of the items 40 has been selected, as shown in FIG. 1, the shortcut indicators 80 might not be displayed. Alternatively, each of the objects 30, items 40, sub-items 50, and any further, lower-level items might have an associated shortcut indicator that is visible at all times and that allows direct access to a menu component.

In an embodiment, selection of one of the items 40 in one of the objects 30 causes that object 30 to increase in size and might cause the other objects 30 to decrease in size or to disappear from the screen 10.

Figure 3:
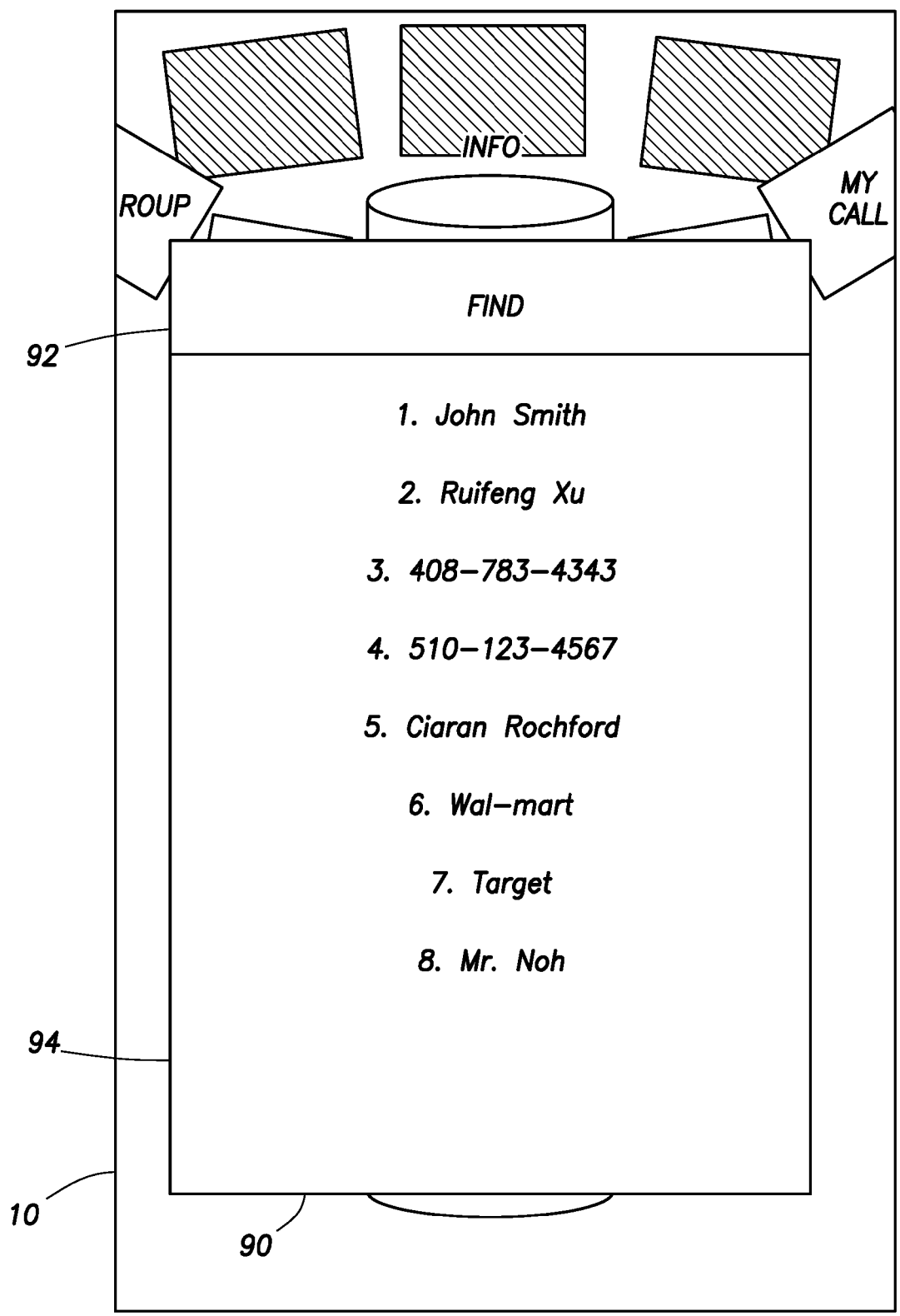
FIG. 3 illustrates yet another portion of the menu system according to an embodiment of the disclosure.

When one of the sub-items 50 is selected, that sub-item 50 might expand to display detailed information. The detailed information might include lowest-level menu elements or might include menu items that can be further expanded to display lower-level menu items. The display of lowest-level menu elements is illustrated in FIG. 3, where the 'find' sub-item 50a has been selected. In this case, the expanded menu 90 includes a header portion 92 that indicates the sub-item 50a from which the expanded menu 90 was expanded. The expanded menu 90 also contains a detail portion 94 that includes a group of lowest-level menu elements. In this case, the lowest-level menu elements are contacts that the user has stored in the handset. If a different one of the sub-items 50 had been selected, an expanded menu appropriate for the selected sub-item 50 might appear.

Alternatively, selecting one of the sub-items 50 might cause the appearance of a menu that can be further expanded to display lower-level menu items. The appearance of lower and lower menu levels can continue as long as necessary to display all of the menus in a menu system. In an embodiment, optimum use of the space in the screen 10 is made by having each successively lower menu disposed approximately perpendicularly to the higher level menu from which it was expanded. For example, the items 40 are disposed in a substantially vertical direction and the sub-items 50 are disposed in a substantially horizontal direction. A sub-menu that appears under one of the sub-items 50 might be disposed in a substantially vertical direction to promote easier viewing of the elements in the sub-menu and prevent obscuring the sub-items 50 already on the screen. A sub-sub-menu that might appear under this sub-menu might be disposed in a substantially horizontal direction, and so on. When a lowest-level menu is reached, the lowest-level menu might substantially fill the screen 10, as shown in FIG. 3.

Any of the lower level menus can take on a three-dimensional, circular appearance similar to the appearance of the sub-items 50 in FIG. 2. Navigation through these 'ring' menus might be done in a similar manner to that described above. Alternatively, if the top-level objects have a shape other than that of a cylinder, a lower level menu might have a shape that corresponds to the shape of the top-level object of which the lower level menu is a component. For example, if a top-level object had a cube shape, a menu expanded from the top-level object might have three-dimensional square appearance.

Figure 4:
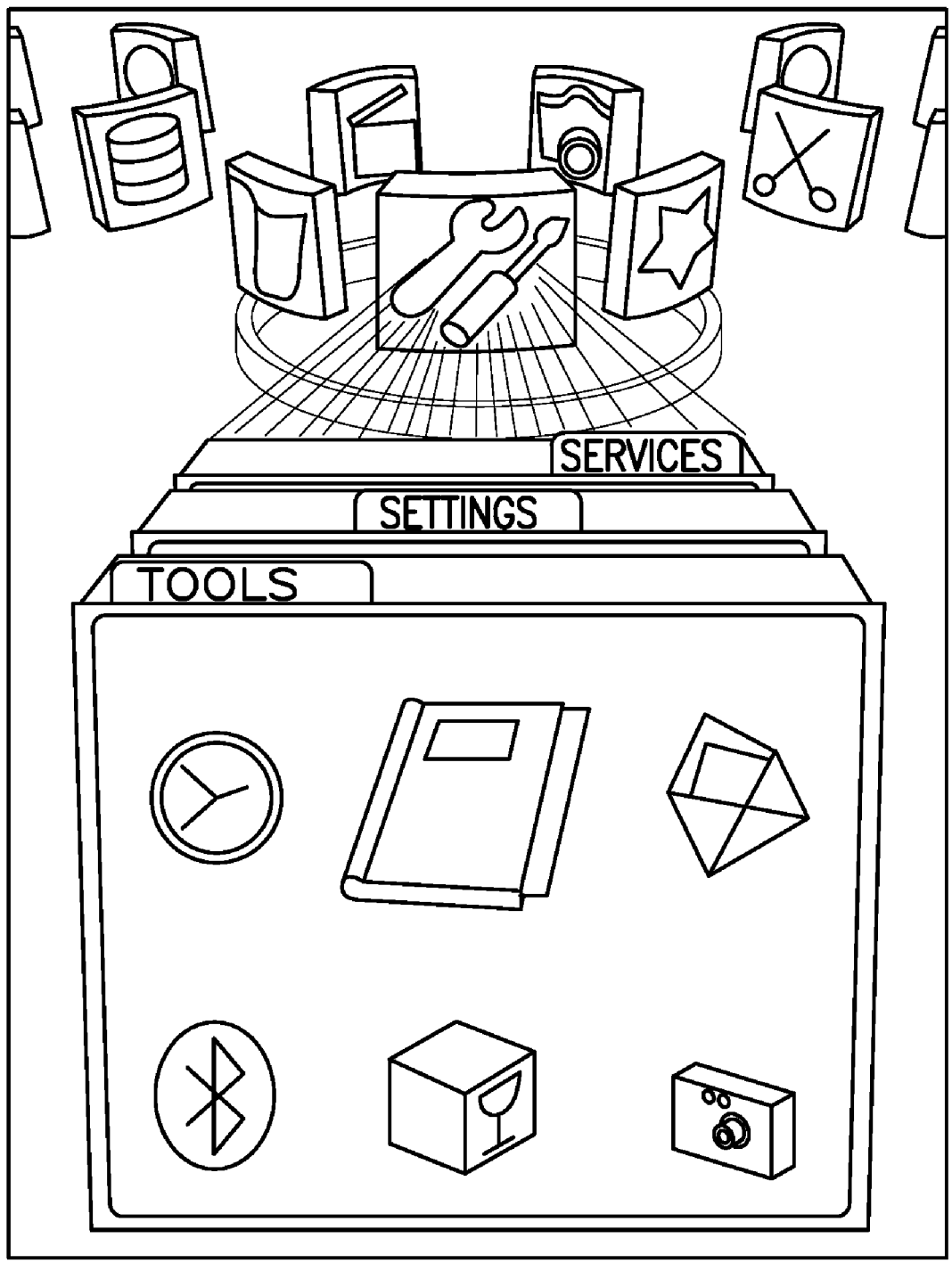
FIG. 4 illustrates a portion of another menu system according to an embodiment of the disclosure.

FIGS. 1, 2, and 3 illustrate one example of a menu system that uses objects with a three-dimensional appearance to contain menu items. FIGS. 4-12 illustrate additional examples of menu systems that use different types of three-dimensional objects to contain menu items. It will be appreciated that other 3-dimensional menus and object configurations will readily suggest themselves to one skilled in the art in view of this disclosure, all of which are within the spirit and scope of this disclosure. In FIG. 4, rectangular-shaped objects are arranged in a circular pattern. Several circular groups of rectangular objects might be present. When one of the rectangular objects is selected, several menu items might appear in an expanded rectangular object. The expanded rectangular object might have several layers, each having a tab or other means for selecting the layer. Additional menu items might appear on each layer.

Figure 5:
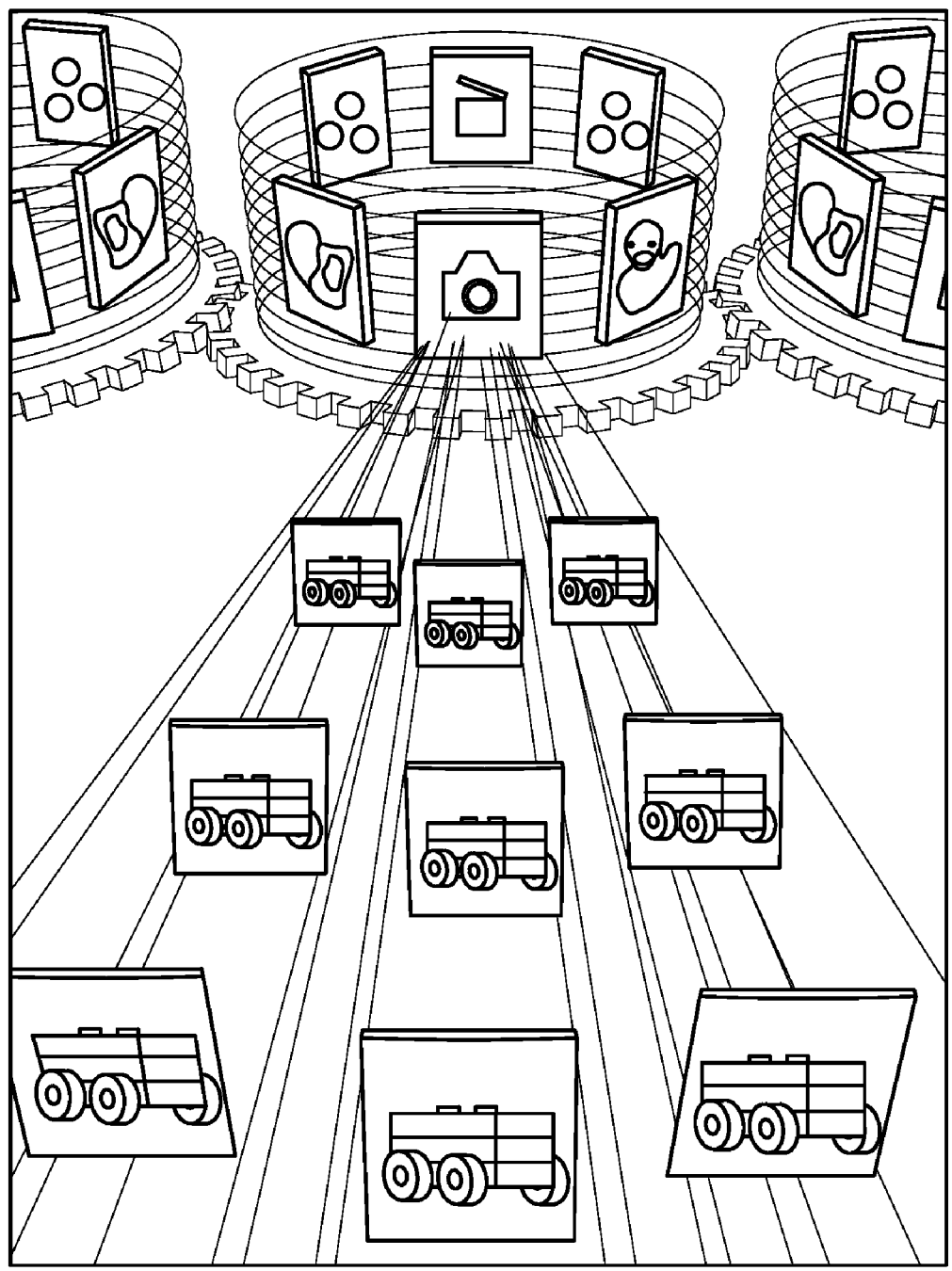
FIG. 5 illustrates a portion of another menu system according to an embodiment of the disclosure.

In FIG. 5, rectangular-shaped objects are again arranged in a circular pattern and several circular groups of rectangular objects might be present. When one of the rectangular objects is selected, a plurality of menu items might appear in an apparent three-dimensional arrangement or in some other appropriate arrangement.

Figure 6:
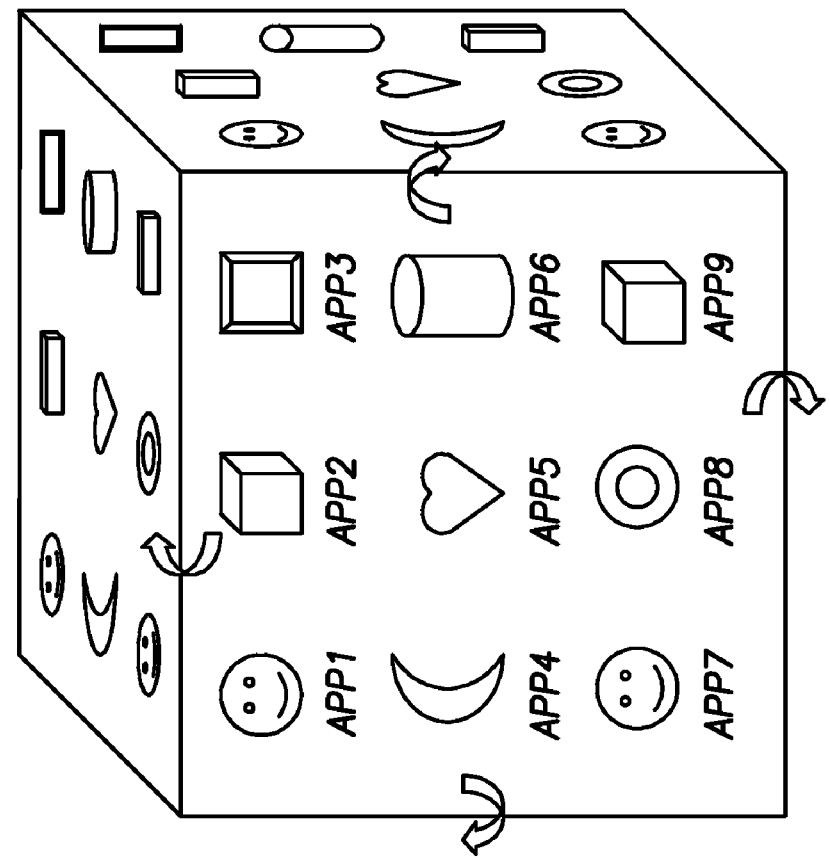
FIG. 6 illustrates a portion of another menu system according to an embodiment of the disclosure.

In FIG. 6, a plurality of menu items appear on each exterior face of a cube or a similar three-dimensional object. A user might press navigation keys or use another navigation method to rotate the cube and cause a desired face of the cube to appear. The user might then select one of the menu items on the face in order to launch an application or cause some other action.

Figure 7:
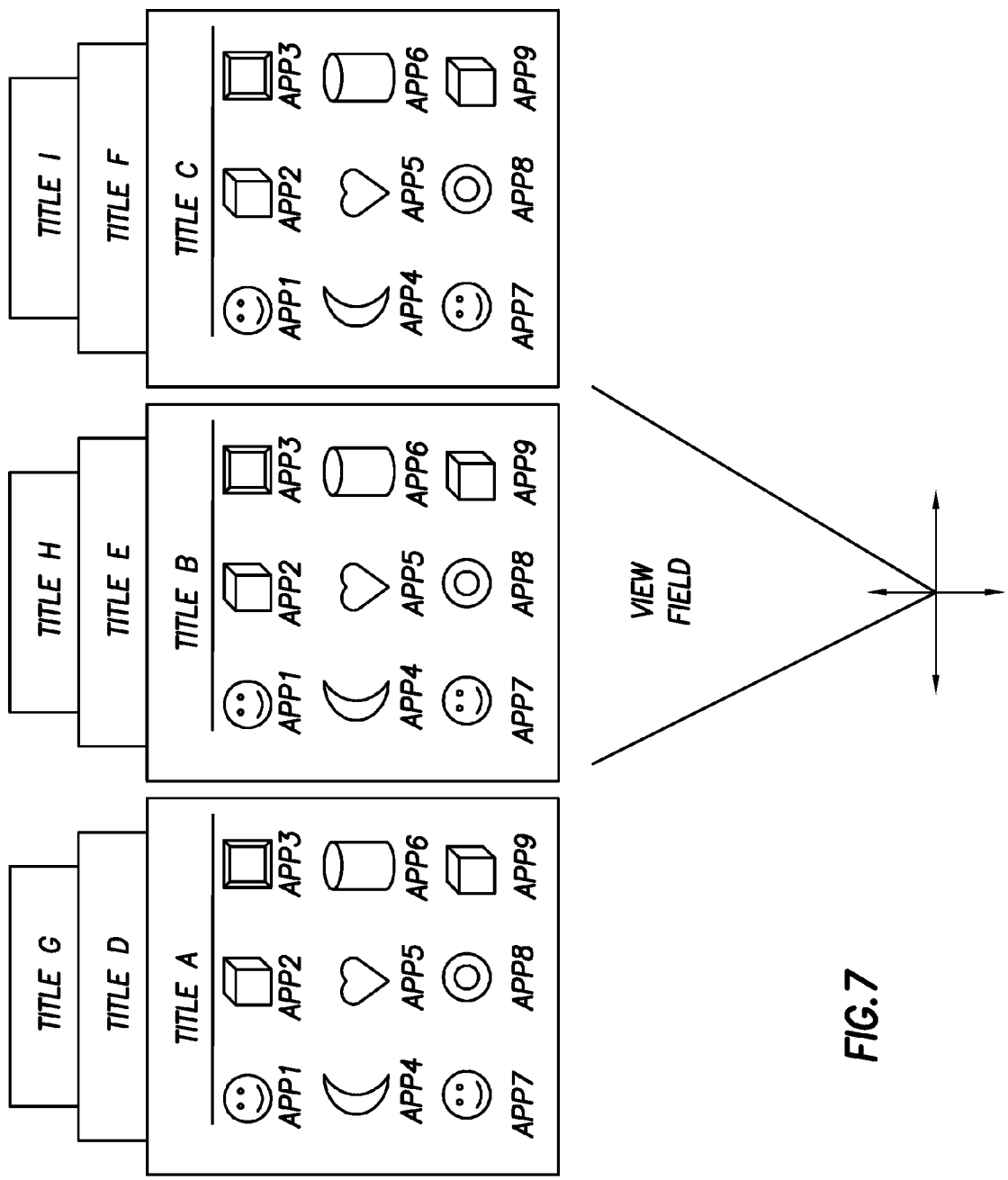
FIG. 7 illustrates a portion of another menu system according to an embodiment of the disclosure.

In FIG. 7, rectangular-shaped objects are arranged in a layered pattern with menu items on each layer. Each layer might have a tab or other means for selecting the layer. Several groups of layered rectangular objects might be present.

Figure 8A:
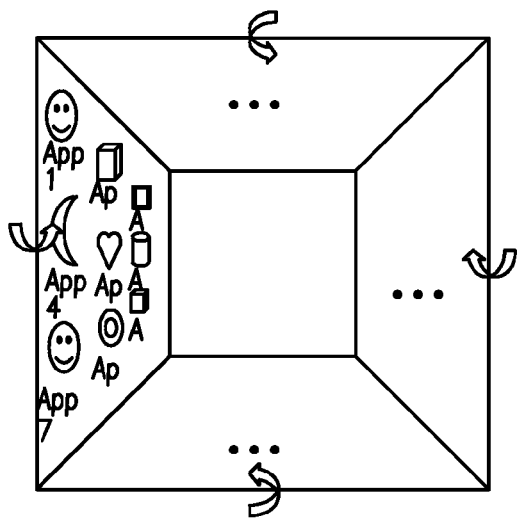
FIGS. 8a, 8b, and 8c illustrate a portion of another menu system according to an embodiment of the disclosure.
Figure 8B:
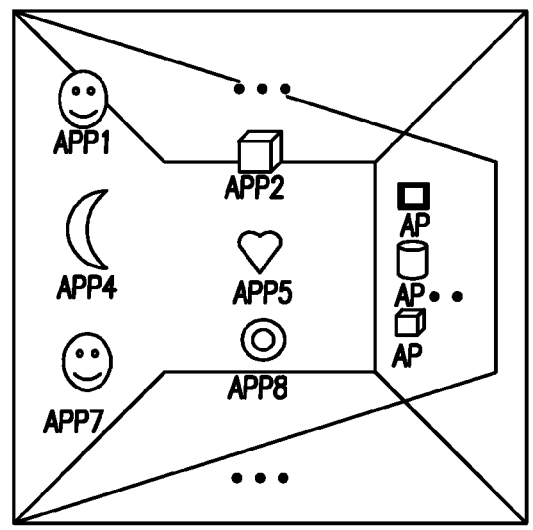
Figure 8C:
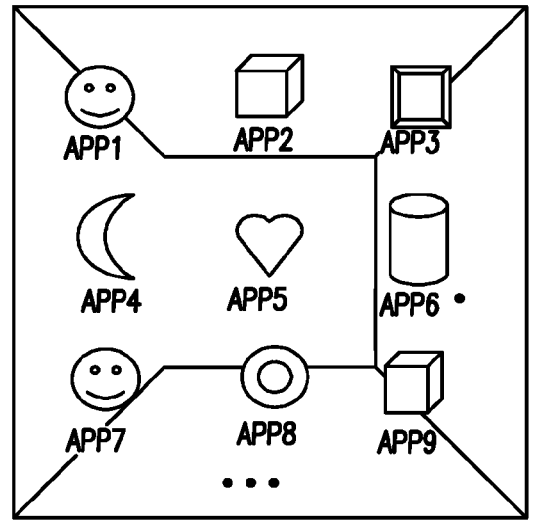

In FIGS. 8a, 8b, and 8c, the user is given the perspective of looking downward into the interior of a cube or a similar three-dimensional object. A plurality of menu items appear on each interior face of the cube. The user might press navigation keys or use another navigation method to select one of the interior faces. The selection of an interior face might cause the interior face to appear to rotate upward so that the interior face appears to cover the upper surface of the cube. The user might then select one of the menu items on the face in order to launch an application or cause some other action.

Figure 9:
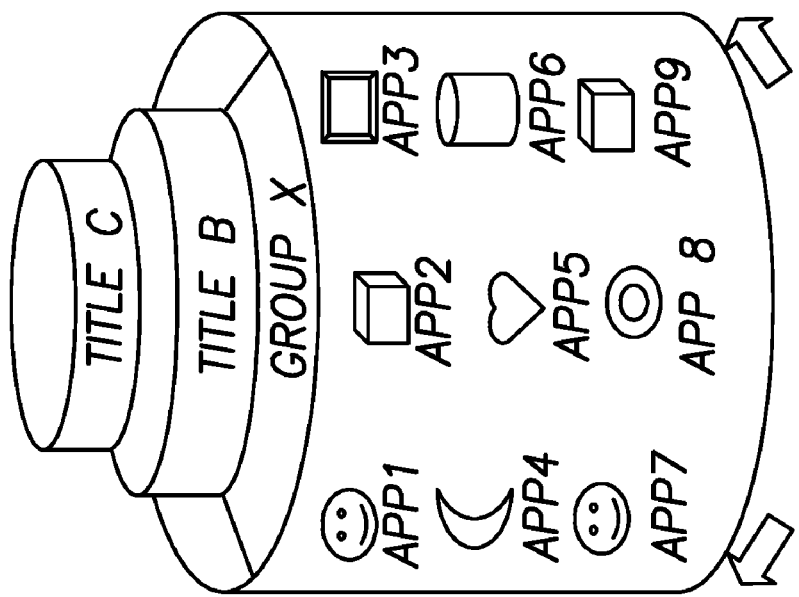
FIG. 9 illustrates a portion of another menu system according to an embodiment of the disclosure.

In FIG. 9, a plurality of menu items appear on the exterior surface of an exterior cylinder or a similar three-dimensional object. One or more additional cylinders might be concentric with and have smaller diameters than the exterior cylinder. Menu items might appear on the surfaces of each of the concentric cylinders. The cylinders might have different heights to facilitate the selection of a cylinder. A user might use navigation keys to rotate the cylinders and to select a cylinder. Selection of a cylinder might cause the menu items on the selected cylinder to appear on the exterior cylinder. The user might then select one of the menu items on the exterior cylinder in order to launch an application or cause some other action.

Figure 10A:
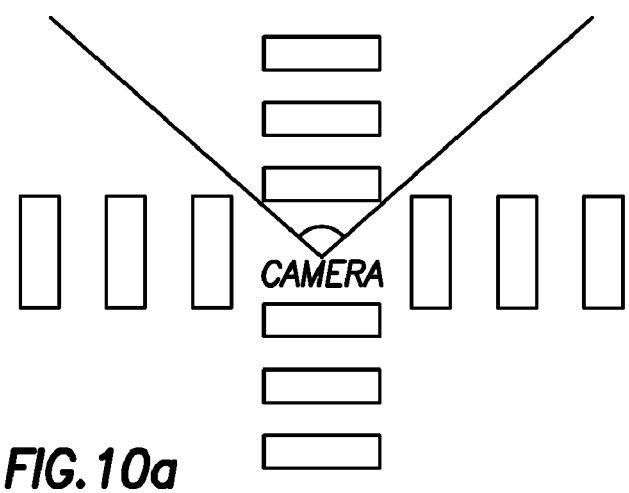
FIGS. 10a and 10b illustrate a portion of another menu system according to an embodiment of the disclosure.
Figure 10B:
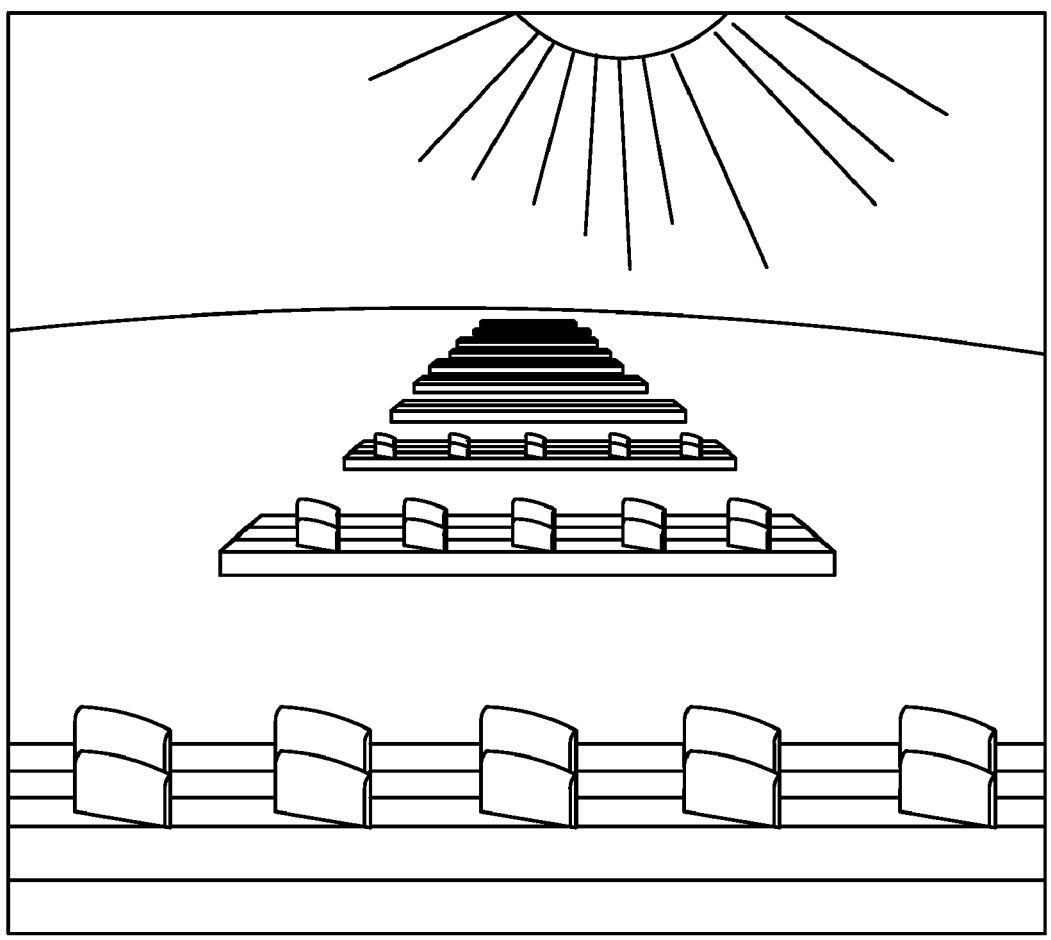

In FIGS. 10a and 10b, the user is given the perspective of being in the center of a three-dimensional field. Menu items might appear in various three-dimensional arrangements in the field. The menu items might appear to be superimposed on various background scenes.

Figure 11:
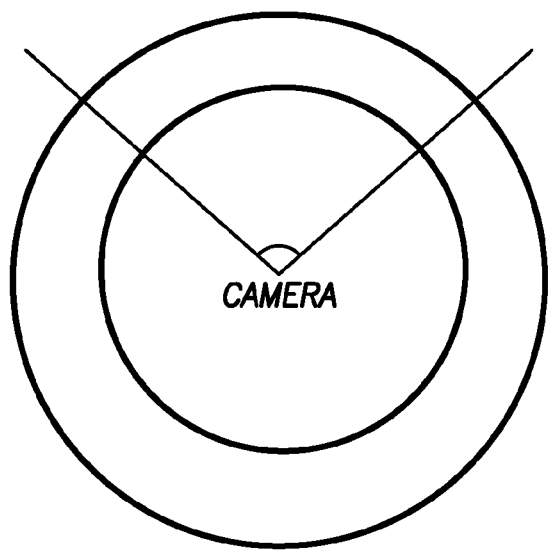
FIG. 11 illustrates a portion of another menu system according to an embodiment of the disclosure.

FIG. 11 represents a menu system that is similar to the cylindrical system of FIG. 9, except that in the example of FIG. 11, the user has the perspective of being in the interior of a set of concentric cylinders. Menu items might appear on the interior surfaces of each of the concentric cylinders.

Figure 12:
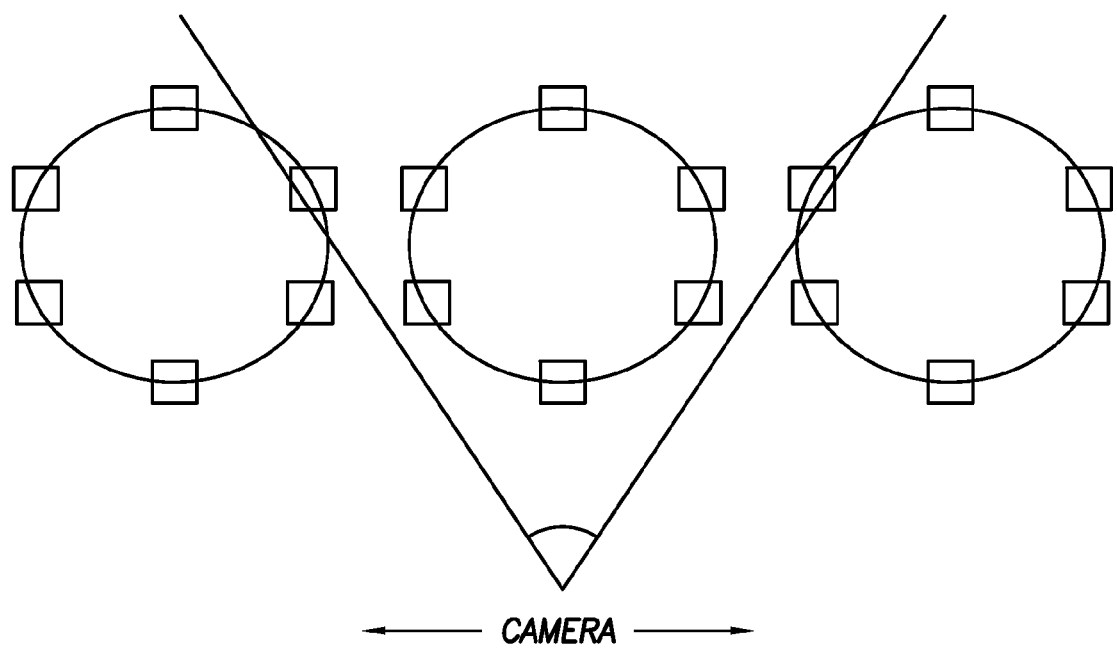
FIG. 12 illustrates a downward-looking perspective of a menu system according to an embodiment of the disclosure.

FIG. 12 represents a downward-looking perspective of the menu systems illustrated in FIGS. 4 and 5.

Figure 13:
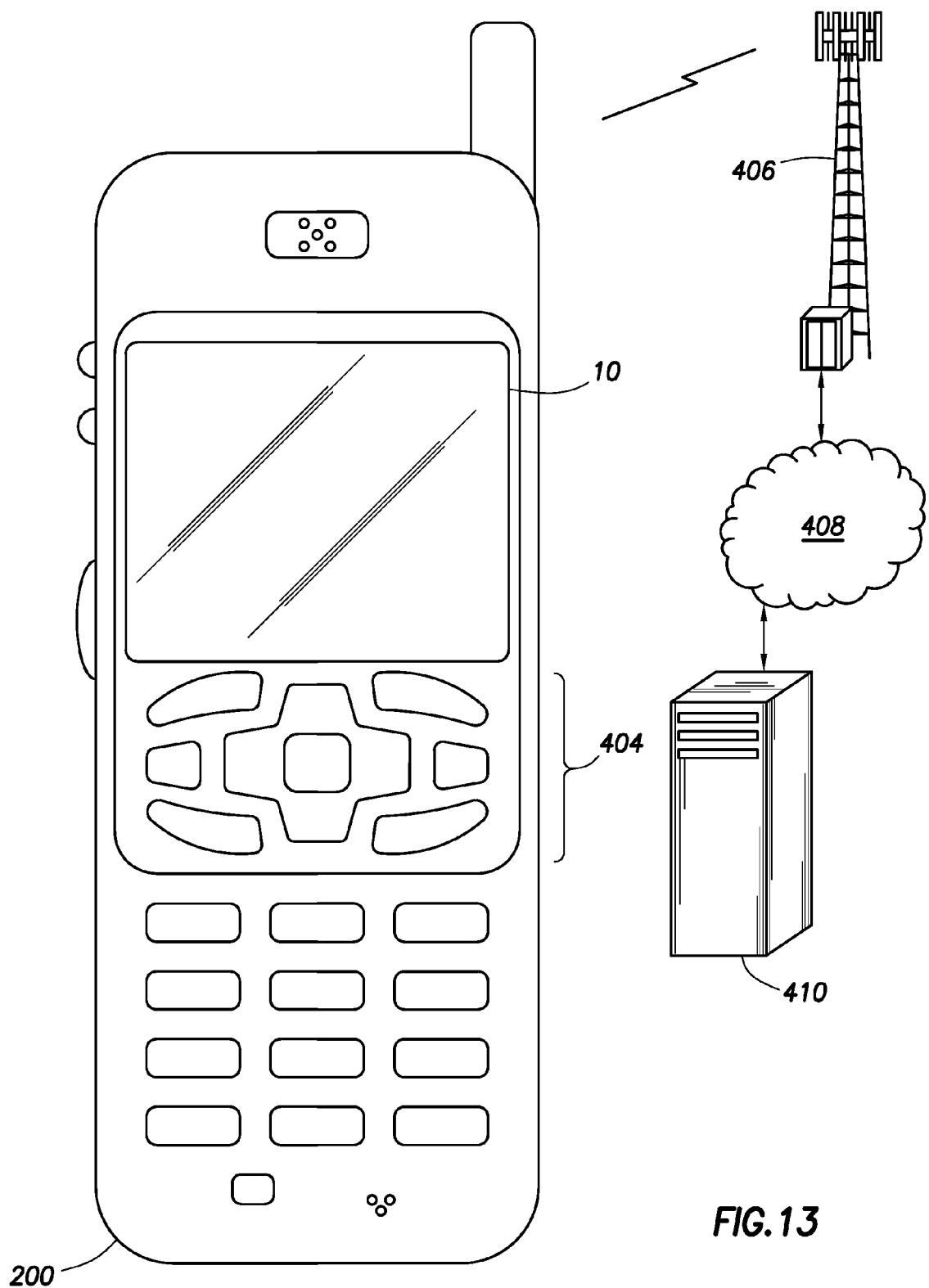
FIG. 13 is a diagram of a wireless communications system including a handset operable for some of the various embodiments of the disclosure.

FIG. 13 shows a wireless communications system including a handset 200. The handset 200 is operable for implementing aspects of the present disclosure, but the present disclosure should not be limited to these implementations. Though illustrated as a mobile phone, the handset 200 may take various forms including a wireless handset, a pager, a personal digital assistant (PDA), a portable computer, a tablet computer, or a laptop computer. Many suitable handsets combine some or all of these functions. In some embodiments of the present disclosure, the handset 200 is not a general purpose computing device like a portable, laptop or tablet computer, but rather is a special-purpose communications device such as a mobile phone, wireless handset, pager, or PDA.

The handset 200 includes the display 10 and a touch-sensitive surface or keys 404 for input by a user. The handset 200 may present options for the user to select, controls for the user to actuate, and/or cursors or other indicators for the user to direct. The handset 200 may further accept data entry from the user, including numbers to dial or various parameter values for configuring the operation of the handset 200. The handset 200 may further execute one or more software or firmware applications in response to user commands. These applications may configure the handset 200 to perform various customized functions in response to user interaction.

Among the various applications executable by the handset 200 are a web browser, which enables the display 10 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 200 has access to information on various servers, such as a server 410. The server 410 may provide content that may be shown on the display 110.

Figure 14:
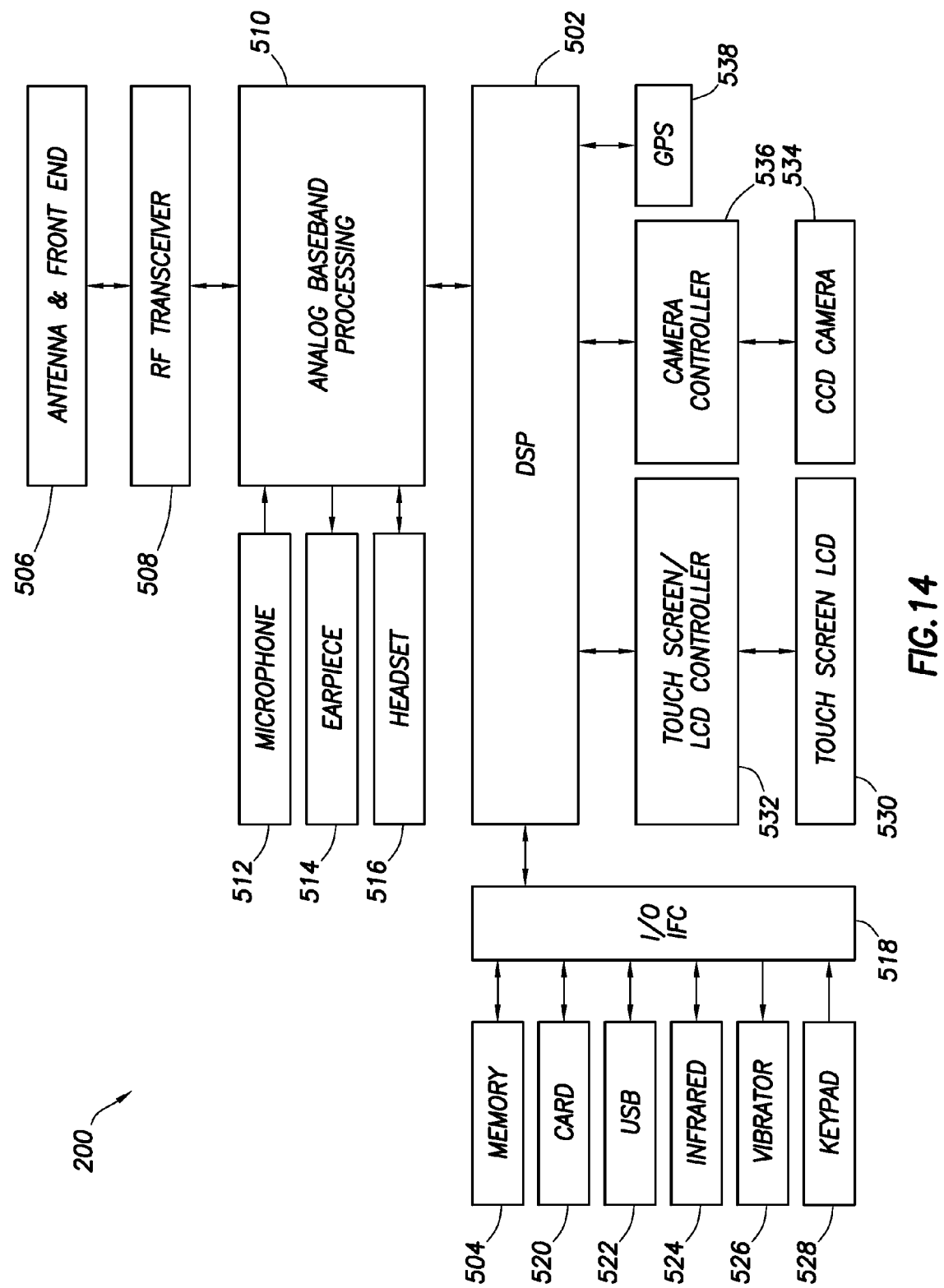
FIG. 14 is a block diagram of a handset operable for some of the various embodiments of the disclosure.

FIG. 14 shows a block diagram of the handset 200. The handset 200 includes a digital signal processor (DSP) 502 and a memory 504. As shown, the handset 200 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 200 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 200 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 200 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 200 to function as a peripheral device to exchange information with a personal computer or other computer system. The infrared port 524 and other optional ports such as a Bluetooth interface or an IEEE 802.11 compliant wireless interface may enable the handset 200 to communicate wirelessly with other nearby handsets and/or wireless base stations.

The input/output interface 518 may further connect the DSP 502 to the vibrator 526 that, when triggered, causes the handset 200 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 200. Another input mechanism may be the touch screen LCD 530, which may also display text and/or graphics to the user. The touch screen LCD controller 532 couples the DSP 502 to the touch screen LCD 530.

The CCD camera 534 enables the handset 200 to take digital pictures. The DSP 502 communicates with the CCD camera 534 via the camera controller 536. The GPS sensor 538 is coupled to the DSP 502 to decode global positioning system signals, thereby enabling the handset 200 to determine its position. Various other peripherals may also be included to provide additional functions, e.g., radio and television reception.

Figure 15:
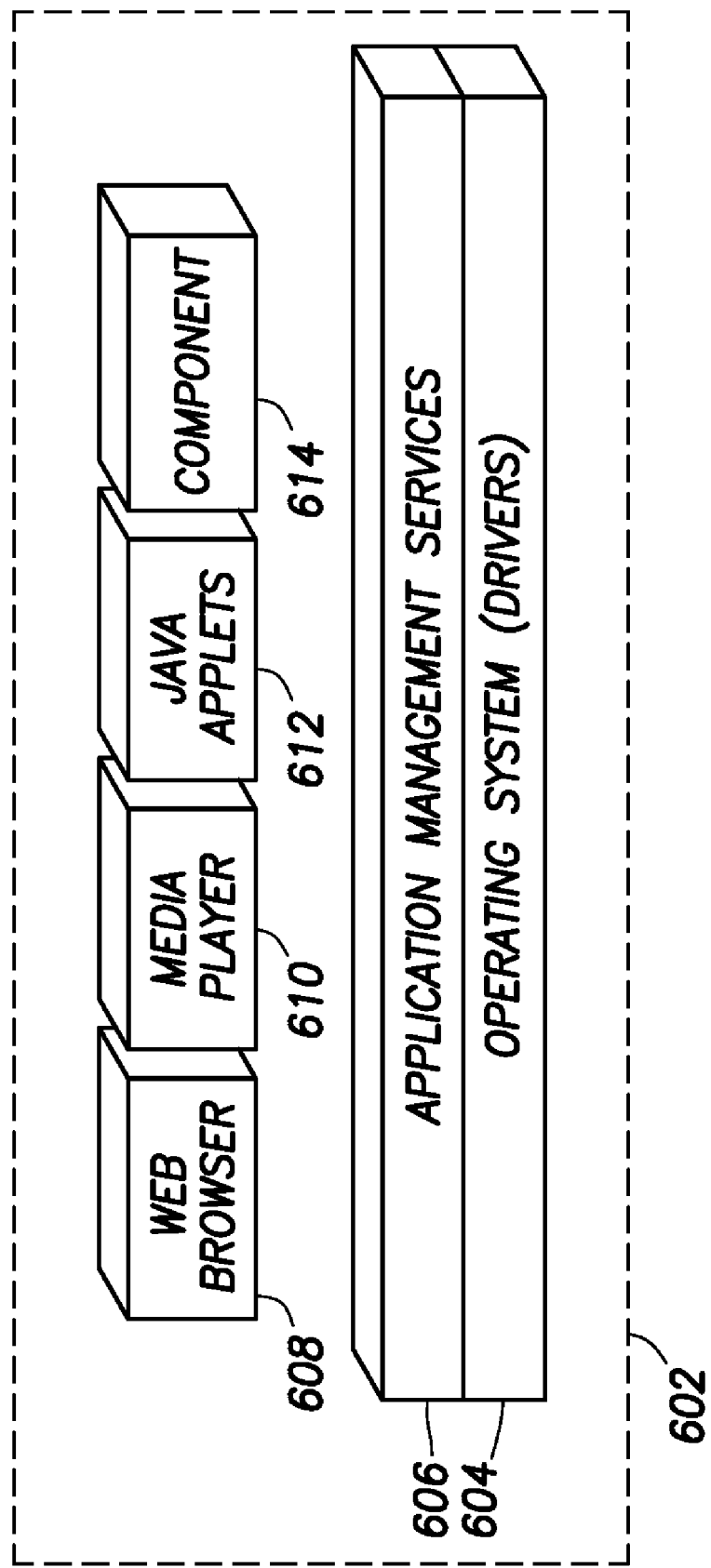
FIG. 15 is a diagram of a software environment that may be implemented on a handset operable for some of the various embodiments of the disclosure.

FIG. 15 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 200. Also shown in FIG. 15 are a web browser application 608, a media player application 610, and Java applets 612. The web browser application 608 configures the handset 200 to operate as a web browser, allowing a user to enter information into forms and select links to retrieve and view web pages. The media player application 610 configures the handset 200 to retrieve and play audio or audiovisual media. The Java applets 612 configure the handset 200 to provide games, utilities, and other functionality. An additional component 614 might manage a menu system as described herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system, comprising
   a display;
   a processor; and
   a storage device operable to store instructions that when executed by the processor displays on the display a graphical user interface including a plurality of objects, the plurality of objects each having a substantially similar shape, each object including a plurality of menu items visible on the object, wherein one or more of the menu items are associated with applications, and wherein at least one group of the plurality of objects is positioned in the foreground and a second group of objects is positioned in the background, and wherein the second group of objects is scaled to emphasize their location in the background, wherein when one of the menu items is selected, a plurality of panes including functions related to the menu item are displayed circumferential about a portion of the associated object and menu item in a 3-dimensional and orbital fashion;
   and wherein the objects are substantially vertically configured such that the objects have a greater vertical dimension and a lesser horizontal dimension.

2. The system of claim 1, wherein the applications include games, address books, and system setting.

3. The system of claim 1, wherein the system is further defined as a desktop computer, workstation computer, a server, a laptop computer, a tablet computer, a mobile wireless handset, and a portable digital assistant (PDA).

4. The system of claim 1, wherein the objects are substantially 3-dimensional.

5. The system of claim 1, wherein the objects have a substantially vertical dimension and wherein the menu items are ordered about the substantially vertical dimension of the objects.

6. The system of claim 1, wherein when the menu item is a contact menu item, the plurality of panes include one or more of a find pane, a new entry pane, and a groups pane.

7. The system of claim 1, wherein when the user navigates between the panes, the panes appear to rotate orbitally about the portion of the associated object and menu item.

8. The system of claim 1, wherein the objects and menu items are navigable using arrow keys such that a user may select one of the object.

9. The system of claim 1, wherein a shortcut is displayed adjacent the menu item, the shortcut identifying a key that launches an associated application when the key is selected.

10. The system of claim 1, wherein the menu items are located on the object substantially stacked one above another.

11. The system of claim 1, wherein the menu items include both alphanumeric indicia and an icon associated with applications.

12. The system of claim 1, wherein the objects further include indicia labeling each object, and wherein the labeling indicia include one of a settings object, a games object, and an applications objects.

13. A mobile handset, comprising:
a processor;
a storage device;
a plurality of applications, at least some of the applications stored on the storage device;
a display; and a program that when executed by the processor displays on the display a graphical user interface including a plurality of 3-dimensional objects, the plurality of objects each having a substantially similar shape, each object including a plurality of menu items visible on the object, wherein one or more of the menu items are associated with applications, and wherein at least one group of the plurality of 3-dimensional objects is positioned in the foreground and a second group of 3-dimensional objects is positioned in the background, and wherein the second group of 3-dimensional objects is scaled to emphasize their location in the background, wherein when one of the menu items is selected, a plurality of panes including functions related to the menu item are displayed circumferential about a portion of the associated object and menu item in a 3-dimensional and orbital fashion; and wherein the objects are substantially vertically configured such that the objects have a greater vertical dimension and a lesser horizontal dimension.

14. The mobile handset of claim 13, wherein the display is further defined as a portrait shaped display having a greater vertical distance and a smaller horizontal distance, and wherein the objects are substantially vertically configured such that the objects have a greater vertical dimension and a smaller horizontal dimension.

15. The mobile handset of claim 14, wherein the objects are further defined as substantially column shaped.

16. The mobile handset of claim 13, wherein the display is further defined as having a greater horizontal distance and a smaller vertical distance, and wherein the objects are substantially horizontally configured such that the objects have a greater horizontal dimension and a smaller vertical dimension.

17. A computer readable medium including instructions that when processed by a processor promotes displaying to a display a graphical user interface, comprising:
a 3-dimensional environment;
a plurality of substantially similar 3-dimensional objects provided in the environment; and a plurality of menu items disposed adjacent the objects, at least some of the menu items related to applications, and wherein at least one group of the plurality of substantially similar 3-dimensional objects is positioned in the foreground and a second group of substantially similar 3-dimensional objects is positioned in the background, and wherein the second group of substantially similar 3-dimensional objects is scaled to emphasize their location in the background, wherein when one of the menu items is selected, a plurality of panes including functions related to the menu item are displayed circumferential about a portion of the associated object and menu item in a 3-dimensional and orbital fashion; and wherein the objects are substantially vertically configured such that the objects have a greater vertical dimension and a lesser horizontal dimension.

18. The computer readable medium of claim 17, wherein the plurality of objects are disposed about the environment, and wherein the menu items are provided on the objects such that a type of the object includes menu items related based on the type of the object.

* * * * *